US006922627B2

(12) United States Patent
Katoh et al.

(10) Patent No.: US 6,922,627 B2
(45) Date of Patent: Jul. 26, 2005

(54) DETECTION OF ENGINE ROTATION SPEED IN SPARK IGNITION INTERNAL COMBUSTION ENGINE

(75) Inventors: Hiroshi Katoh, Yokohama (JP); Ritsuo Sato, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 69 days.

(21) Appl. No.: 10/700,506

(22) Filed: Nov. 5, 2003

(65) Prior Publication Data

US 2004/0122582 A1 Jun. 24, 2004

(30) Foreign Application Priority Data

Dec. 20, 2002 (JP) ....................................... 2002-369849

(51) Int. Cl.[7] ................................................ G06F 19/00
(52) U.S. Cl. ....................................... 701/110; 701/104
(58) Field of Search ................................ 701/102, 104, 701/105, 110, 111

(56) References Cited

U.S. PATENT DOCUMENTS 5,279,272 A * 1/1994 Kruger ....................... 123/486
5,345,909 A * 9/1994 Fukui et al. ........... 123/406.58
5,604,304 A * 2/1997 Kokubo et al. ............ 73/117.3
5,671,714 A * 9/1997 Fukui et al. ........... 123/406.62
5,755,206 A * 5/1998 Takahashi et al. ..... 123/406.37
5,881,694 A 3/1999 Nakada
6,009,852 A 1/2000 Akabori et al.
6,732,709 B1 * 5/2004 Havran et al. ......... 123/406.24
2002/0062801 A1 * 5/2002 Shimizu .................. 123/90.16
2002/0139329 A1 * 10/2002 Machida .................. 123/90.16

FOREIGN PATENT DOCUMENTS

EP 1 065 349 A2 1/2001
JP 2001-082302 A 3/2001

* cited by examiner

*Primary Examiner*—John T. Kwon
(74) *Attorney, Agent, or Firm*—Foley & Lardner LLP

(57) ABSTRACT

A spark ignition internal combustion engine (2) performs ignition within a fixed ignition crank angle range. The operation control device comprises a programmable controller (1) and a unit crank angle sensor (9) outputting a unit crank angle signal on each unit crank angle. The controller (1) calculates the engine rotation speed based on the unit crank angle signals (S1). By preventing the calculation of the engine rotation speed based on the unit crank angle signals detected in the ignition crank angle range, errors in the calculation of the engine rotation speed resulting from engine ignition noise are eliminated and a precise engine rotation speed is obtained.

17 Claims, 9 Drawing Sheets

4 AIR FLOW METER
8 FUEL INJECTOR
9 CRANK ANGLE SENSOR
11 CAM POSITION SENSOR
13 IGNITION SWITCH
14 IGNITION COIL
15 WATER TEMPERATURE SENSOR
16 OXYGEN SENSOR

DETECTION OF ENGINE ROTATION SPEED IN SPARK IGNITION INTERNAL COMBUSTION ENGINE

FIELD OF THE INVENTION

This invention relates to detection of the engine rotation speed in a spark ignition internal combustion engine.

BACKGROUND OF THE INVENTION

JP2001-082302A published by the Japanese Patent Office in 2001 discloses ignition timing control of an internal combustion engine using a rotation speed of the engine as a parameter. A crank angle sensor detects the engine rotation speed. The crank angle sensor outputs a signal when the crankshaft of the engine reaches a defined reference rotation position for each cylinder.

A separate signal is outputted when the crank shaft rotates through a unit angle which is set for example to one degree. The former signal is termed a reference position signal or a REF signal and the latter is termed a unit crank angle signal or a POS signal.

The engine rotation speed is obtained by measuring the interval between the REF signal and the POS signal. Since the POS signal is updated more frequently than the REF signal, the rotation speed obtained from the POS signal has a higher tracking ability of the real rotation speed of the engine than that obtained from the REF signal.

SUMMARY OF THE INVENTION

When the control of the ignition timing, the fuel injection amount or the fuel injection timing of the engine is executed at short intervals such as ten milliseconds, the engine rotation speed is calculated on each cycle using the POS signal. In this case, when the detection timing of the POS signal overlaps with the spark plug ignition, there is the possibility that ignition noise will be mistakenly detected as a POS signal. As a result, a large error may be introduced into the calculation of the engine rotation speed.

It is therefore an object of this invention to eliminate the effect of ignition noise on detection of the engine rotation speed.

If the control of the ignition timing, the fuel injection amount or the fuel injection timing of the engine is executed on a fixed cycle, the control target value for the ignition timing, the fuel injection amount and the fuel injection timing are updated on a fixed cycle. The control target value is then set to a register. Actual ignition or fuel injection is performed at a specific crank angle which corresponds to the target ignition timing or the target fuel injection timing. As a result, there is a time lag between the time the POS signal is detected for the calculation of the engine rotation speed and the time at which ignition or fuel injection is actually performed. Thus when the rotation speed of the engine undergoes a large fluctuation, this time lag reduces the accuracy of the control routine. When the detection of the engine rotation speed and the control target value are updated using the crank angle, in other words, when the updating process is performed in synchronism with the REF signal, the period from the detection of the engine rotation speed to actual fuel injection or ignition becomes fixed. Thus it is possible to improve control accuracy. However in this case, the control interval varies depending on the engine rotation speed, so the calculation load per unit time required for updating the control target value becomes excessively large at high engine rotation speeds.

It is a further object of this invention to shorten the time period from detecting the engine rotation speed to the control of the fuel injection or ignition without excessively increasing the calculation load.

In order to achieve the above objects, this invention provides an operation control device for an spark ignition internal combustion engine performing ignition in a fixed ignition crank angle range, comprising a unit crank angle sensor which output a unit crank angle signal corresponding to a unit crank angle of the engine; and a programmable controller programmed to calculate an engine rotation speed based on the unit crank angle signal while preventing the calculation of the engine rotation speed based on the unit crank angle signal detected in the ignition crank angle range from being performed, and control the engine according to the engine rotation speed.

This invention also provides an operation control method for an spark ignition internal combustion engine performing ignition in a fixed ignition crank angle range. The method comprises detecting a unit crank angle signal of the engine, calculating an engine rotation speed based on the unit crank angle signal while preventing the calculation of the engine rotation speed based on the unit crank angle signal detected in the ignition crank angle range from being performed, and controlling the engine according to the engine rotation speed.

The details as well as other features and advantages of this invention are set forth in the remainder of the specification and are shown in the accompanying drawings.

DESCRIPTION OF THE PREFERRED EMBODIMENTS

Figure 1:
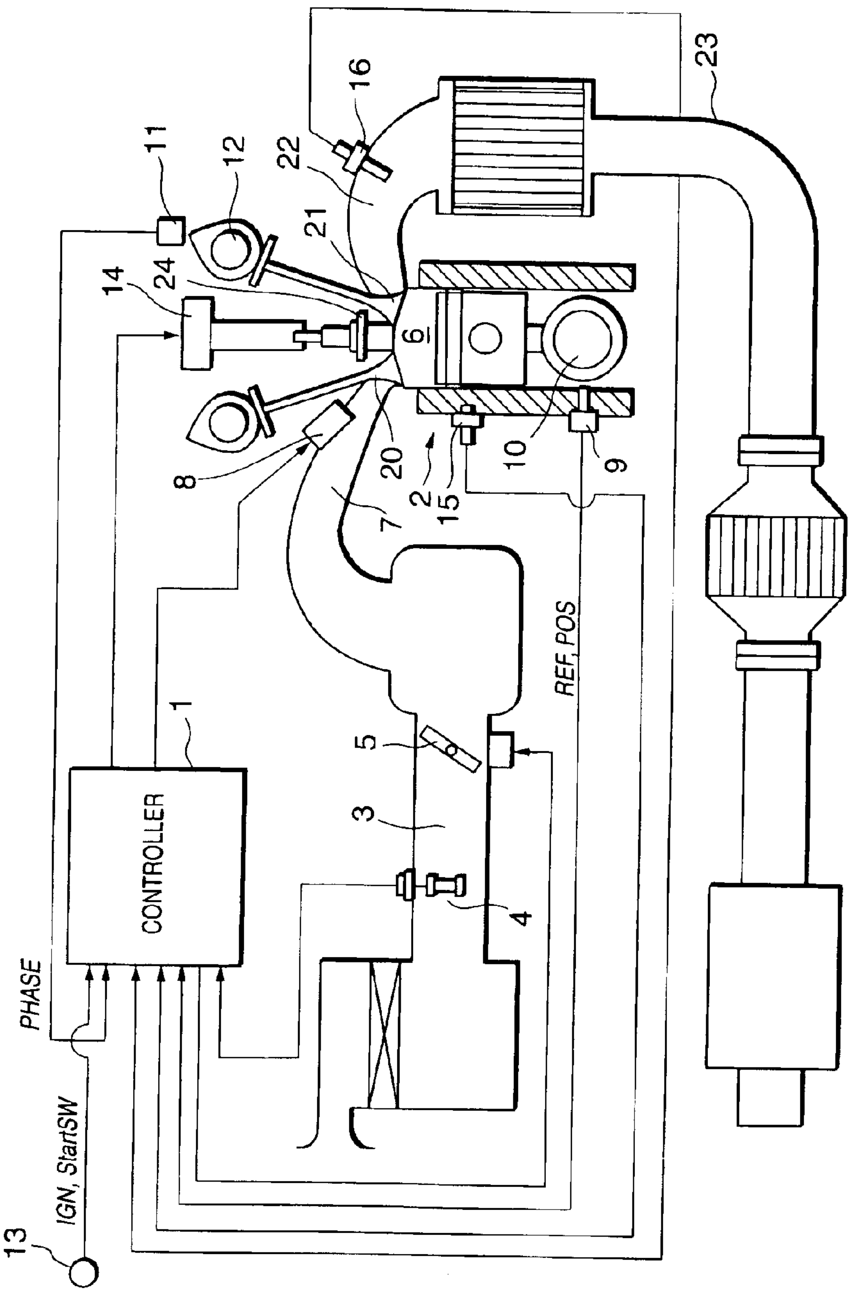
FIG. 1 is a schematic diagram of an engine control device according to this invention.

Referring to FIG. 1 of the drawings, a four-stroke cycle six-cylinder V-shape engine 2 applying this invention comprises an intake pipe 3 and an exhaust pipe 23. The intake pipe 3 is connected via an intake port 7 provided with an intake valve 20 to the combustion chamber 6 of each cylinder. The exhaust pipe 23 is connected to the combustion chamber 6 of each cylinder via an exhaust port 22 provided with an exhaust valve 21.

An electronic throttle 5 is provided in the intake pipe 3. A fuel injector 8 is provided in proximity to the intake valve 20 in the intake port 7. One fuel injector 8 is provided for each cylinder. Gasoline fuel is supplied at a fixed pressure to the fuel injector 8. When the fuel injector 8 is opened, an amount of gasoline fuel which corresponds to the lift period is injected towards the intake air entering from the intake port 7 to the combustion chamber 6.

The fuel injection timing and the fuel injection amount from the fuel injector 8 of each cylinder are controlled by a pulse signal output from the controller 1 to each fuel injector 8. The fuel injectors 8 initiate fuel injection simultaneously with the input of the pulse signal and injection is continuously performed during an interval equal to the pulse width of the pulse signal.

A gaseous mixture with a fixed air-fuel ratio is produced in the combustion chamber 6 of each cylinder as a result of the fuel injection from the fuel injector 8 and the intake air from the intake pipe 3. A spark plug 24 facing the combustion chamber 6 is sparked in response to a high-voltage current produced by an ignition coil 14 and ignites and burns the gaseous mixture in the combustion chamber 6. The ignition timing of the spark plug 24 is controlled by an ignition signal output from the controller 1 to the ignition coil 14.

The stroke pattern of the four-stroke cycle engine 2 comprises an intake stroke, a compression stroke, an expansion stroke and an exhaust stroke. These four stroke cycles vary with respect to the top dead center (TDC) and the bottom dead center (BDC) defined by the vertical motion of the piston in each cylinder.

Ignition is performed in this type of engine 2 in a fixed advance range from a compression top dead center (CTDC) which is the end point of the compression stroke for each cylinder. In other words, ignition is performed during the compression stroke. The angular range expressed by a crank angle is termed an ignition crank angle range.

The controller 1 comprises a microcomputer provided with a central processing unit (CPU), a read-only memory (ROM), a random access memory (RAM) and an input/output interface (I/O interface). The controller 21 may comprise a plurality of microcomputers.

Signals representing detection data are input to the controller 1 for fuel injection control and ignition control. Signals are input from an air flow meter 4 detecting an intake air amount in the engine 2, a crank angle sensor 9, a cam position sensor 11, an ignition switch 13, a water temperature sensor 15 detecting a cooling water temperature of the engine 2 and an oxygen sensor 16 detecting an oxygen concentration in the exhaust gas from the engine 2.

The crank angle sensor 9 outputs a REF signal when a crankshaft 10 of the engine 2 arrives at a reference rotation position. Furthermore a POS signal is output when the crankshaft 10 rotates through a unit angle which is set for example at one degree. The reference rotation position corresponds to a rotation position 110 degrees before the top dead center (TDC) for each cylinder in a six-cylinder sixty decree V-shape engine.

The cam position sensor 11 outputs a PHASE signal in response to a specific rotation position of the cam 12 driving the exhaust gas valve 21. In a four-stroke cycle engine 2, ignition is performed in each cylinder once for every two REF signals. The top dead center (TDC) comprises a compression top dead center (CTDC) and an exhaust top dead center (ETDC). The controller 1 discriminates these signals based on the combination of the REF signal and the PHASE signal.

The ignition switch 13 places the spark plug 24 by outputting an ignition signal IGN in a state where ignition can take place. The ignition switch 13 also outputs a start signal StartSW in order to start the operation of a starter motor cranking the engine 2.

Figure 2:
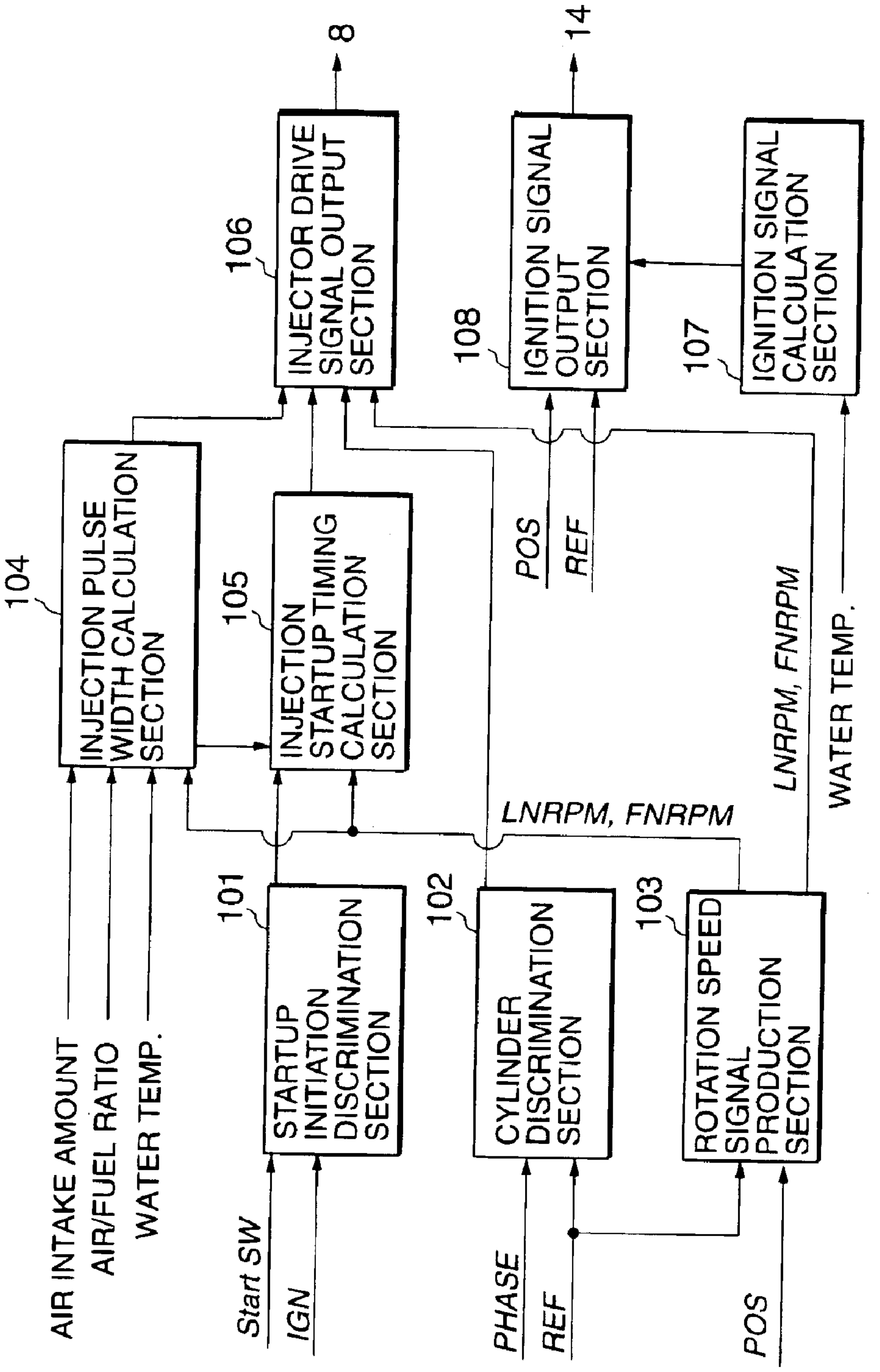
FIG. 2 is a block diagram describing the function of a controller according to this invention.

Referring to FIG. 2, the controller 1 comprises a startup initiation discrimination section 101, a cylinder discrimination section 102, a rotation speed signal production section 103, an injection pulse width calculation section 104, an injection start timing calculation section 105, an injector drive signal output section 106, an ignition signal calculation section 107 and an ignition signal output section 108. Each of these sections is a virtual section representing the functions of the controller 1 and does not have physical existence.

The startup initiation discrimination section 101 detects startup of cranking of the engine 2 based on the start signal StartSW and the ignition signal IGN from the ignition switch 13. Engine startup is determined when the start signal is ON.

The cylinder discrimination section 102 uses the POS signal output by the crank angle sensor 9 and the PHASE signal output by the cam position sensor 11 in order to determine the respective stroke positions of each cylinder of the engine 2. In the description hereafter, this determination is termed cylinder discrimination.

The rotation speed signal production section 103 calculates an engine rotation speed LNRPM based on the output interval of the REF signal from the crank angle sensor 9. The rotation speed signal production section 103 also calculates an engine rotation speed FNRMP3 based on the output interval of the POS signal from the crank angle sensor 9. However the POS signal used in the calculation according to this invention is limited to POS signals detected outside the ignition crank angle range. This range is termed as a non-ignition crank angle range.

The injection pulse width calculation section 104 calculates the basic fuel injection pulse width by looking up a pre-stored map based on the engine rotation speed calculated by the rotation speed signal production section 103 and the intake air amount detected by the air flow meter 4.

The injection pulse width calculation section 104 determines a target fuel injection pulse width by adding a correction to the basic fuel injection pulse width so that the gaseous mixture in the combustion chamber 6 coincides with a fixed target air-fuel ratio. The fuel correction amount is calculated based on the oxygen concentration in the exhaust gas detected by the oxygen sensor 16 and the cooling water temperature detected by the water temperature sensor 15.

When starting the engine 2, the injection pulse width calculation section 104 determines the target fuel injection pulse width using a method described hereafter which differs from the method for normal operating states.

The injection initiation timing calculation section 105 calculates the target initial timing of the fuel injection based on the injection pulse width and the engine rotation speed.

The injector drive signal output section 106 outputs a pulse signal for the target fuel injection pulse width to the fuel injector 8 at the target start timing for fuel injection.

The ignition signal calculation section 107 determines a target ignition timing of the spark plug 24 based on the engine rotation speed and the water cooling temperature of the engine 2.

The ignition signal output section 108 sparks the spark plug 24 by controlling current supply to the ignition coil 14 at a target ignition timing based on the POS signal and the REF signal.

Next, referring to FIG. 3, a control routine for the fuel injection and ignition of the engine 2 executed by the controller 1 as structured above will be described hereafter. This routine is executed at intervals of ten milliseconds while the engine 2 is operating.

Firstly in a step S1, the controller 1 calculates the engine rotation speed FNRPM3 based on the interval of the most recent POS signal detected outside the ignition crank angle range.

Figure 4:
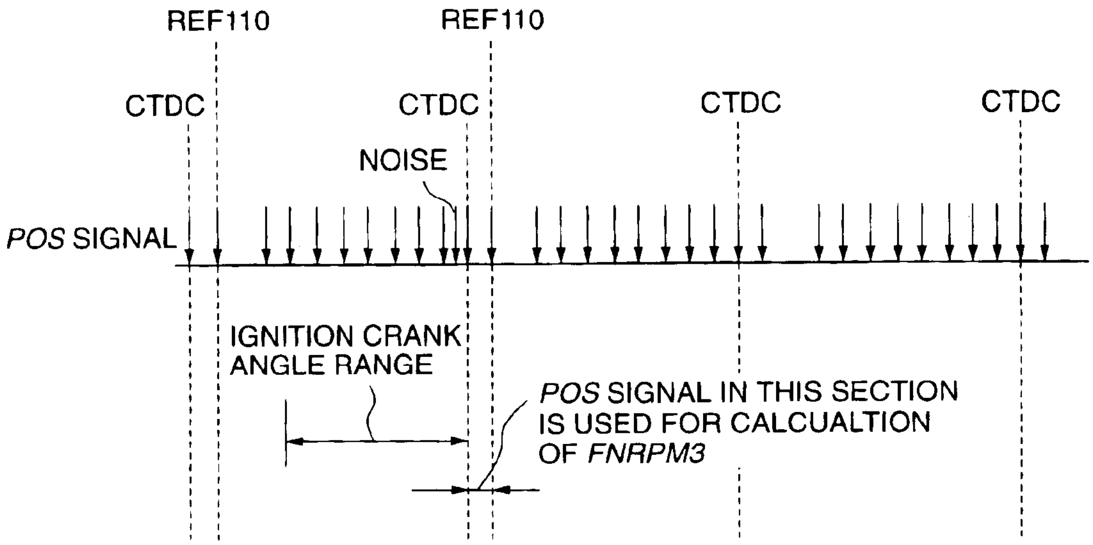
FIG. 4 is a diagram describing a POS signal detection timing according to this invention.

Referring to FIG. 4, the determination of the ignition crank angle range determined in the step S1 will be described below. In a six-cylinder V-shape engine, a REF signal is output at 110 degrees before top dead center (110 degree BTDC) for each cylinder. The ignition timing during engine startup is delayed at most until the compression top dead center (CTDC). After engine startup, the ignition timing is advanced in a fixed angular range in response to the increase in the rotation speed. The fixed advance angular range from CTDC is taken to be the ignition crank angle range in view of the possibility that ignition takes place depending on operating conditions.

In the step S1, the calculation of the engine rotation speed FNRPM3 based on the POS signal detected in the ignition crank angle range set as described above is prohibited. This is achieved by calculating the engine rotation speed FNRPM3 based on the interval of the most recent POS signal detected in the non-ignition crank angle range. As a result, a time lag necessarily results between the input of the POS signal forming the basis of the calculation and the time the engine rotation speed FNRPM3 is actually calculated. The controller 1 sequentially stores the POS signals and the REF signals input from the crank angle sensor 9 in the memory. The controller 1 selects the most recent two POS signals in the non-ignition crank angle range from among the stored POS signals in the memory (RAM) and calculates the engine rotation speed FNRPM3 on the basis of the interval of these signals.

In FIG. 4, the interval from the compression top dead center (CTDC) to the REF signal REF 110 input immediately thereafter always resides in the non-ignition crank angle range. In the step S1, it is also preferred that the engine rotation speed FNRPM3 is calculated from the interval of the most recent POS signal obtained in the range between CTDC and REF 110.

Detection of the POS signal without interference from ignition noise is achieved by limiting the detection interval of the POS signal to the non-ignition crank angle range. Thus it is possible to improve the calculation accuracy of the engine rotation speed. This routine allows the calculation of the engine rotation speed FNRPM3 to be calculation only once every ten milliseconds rather than being dependent on the input frequency of the REF signal. Thus the calculation load is not increased even in high rotation engine performance regions in which the input frequency of the REF signal is high.

In a step S2, the controller 1 calculates the engine rotation speed LNRPM from the most recent input interval of the REF signal.

In a step S3, the controller 1 uses the engine rotation speed FNRPM3 and the intake air amount detected by the air flow meter 4 in order to calculate the basic fuel injection pulse width by looking up a map which is pre-stored in the memory (ROM). The injection pulse width is determined by adding a correction to the basic fuel injection pulse width so that the gaseous mixture in the combustion chamber 6 coincides with a fixed target air-fuel ratio. The correction is based on the oxygen concentration in exhaust gas detected by the oxygen sensor 16 and the cooling water temperature detected by the water temperature sensor 15.

Then in a step S4, the controller 1 determines the ignition timing of the spark plug 24 on the basis of the cooling water temperature of the engine 2 and the engine rotation speed FNRPM3.

Next in a step S5, the controller 1 calculates the start timing for fuel injection based on the engine rotation speed FNRPM3 and the injection pulse width.

Finally in a step S6, the controller 1 sets the ignition timing, the start timing for fuel injection and the injection pulse width to a register. The output of the ignition signal to the ignition coil 14 and the output of the fuel injection pulse signal to the fuel injector 8 are both performed at the set timing.

Referring to FIGS. 5A–5G, the difference on ignition timing control during engine startup which results from using the engine rotation speed LNRPM based on the REF signal and using the engine rotation speed FNRPM3 based on the POS signal will be described.

Figures 5A, 5B, 5C, 5D, 5E, 5F, 5G:
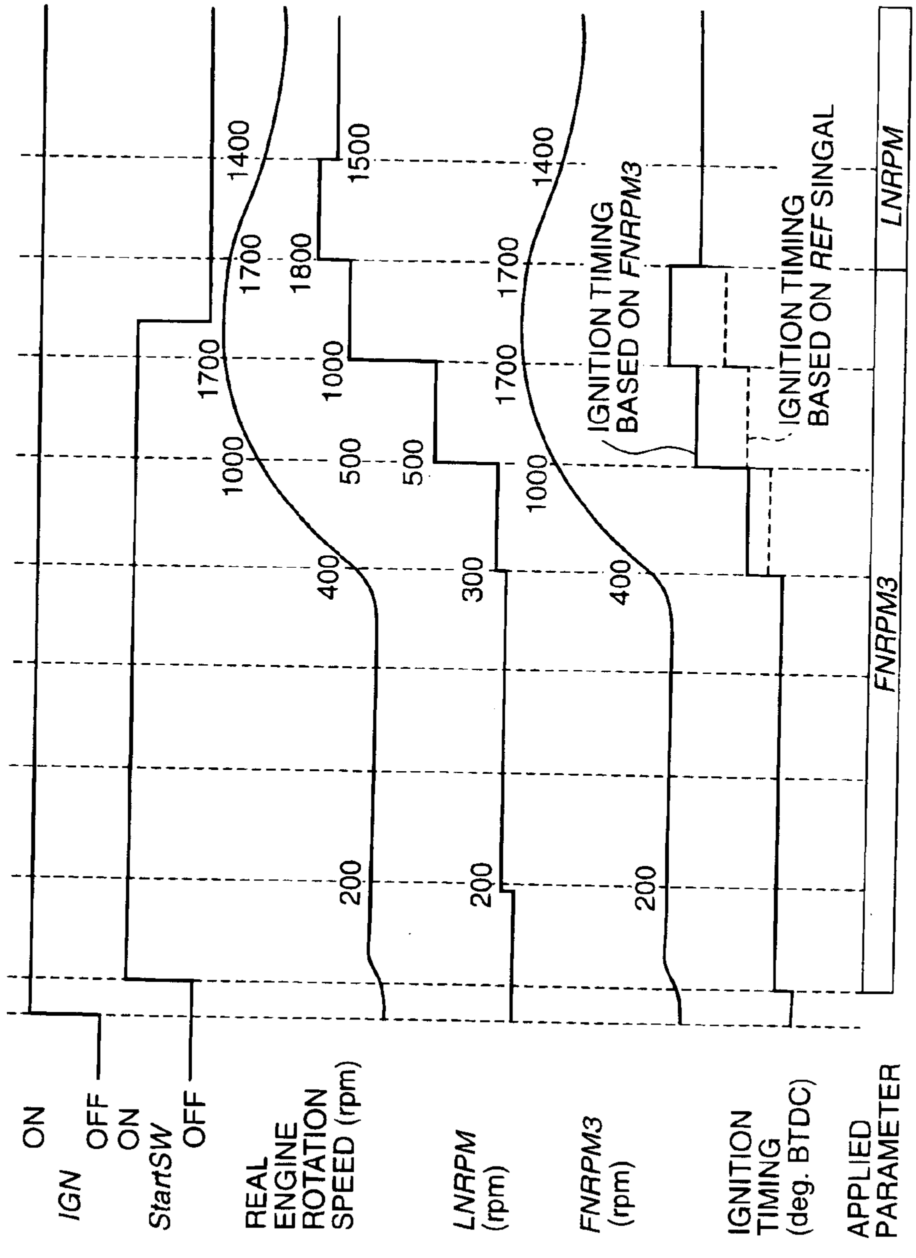
FIGS. 5A–5G are timing charts showing the difference in the ignition timing control caused by the rotation speed based on a POS signal and the rotation speed based on a REF signal.

The REF signal does not display a high correspondence to the actual engine rotation speed due to the low updating frequency in comparison to the POS signal. As a result, as shown in FIGS. 5C–5D, when the engine rotation speed undergoes a large increase during engine startup for example, the engine rotation speed LNRPM based on the REF signal is a smaller value than the real engine rotation speed.

The ignition timing which maximizes the engine output shaft torque is termed the minimum spark advance for best torque (MBT). MBT is delayed as the engine rotation speed decreases. As a result, when the ignition timing is set according to the engine rotation speed LNRPM obtained from the REF signal while the engine rotation speed is increasing, the ignition timing is delayed from the preferred ignition timing as shown by the broken line in FIG. 5F. Consequently it is not possible to obtain a sufficient shaft torque. Thus when calculating the ignition timing, it is preferred to use the engine rotation speed FNRPM3 based on the POS signal which displays a high correspondence to the actual engine rotation speed.

This problem does not always arise after startup when the engine rotation speed does not undergo a large variation. Thus only while the startup signal is ON as shown by FIG. 5G, the ignition timing is set using the engine rotation speed FNRPM3 based on the POS signal. After the start signal StartSW shifts to OFF, it is possible to set the ignition timing using the engine rotation speed LNRPM based on the REF signal.

Next referring to FIGS. 6A and 6B, FIG. 7 and FIGS. 8A–8F, a second embodiment of this embodiment will be described.

Figure 6B:
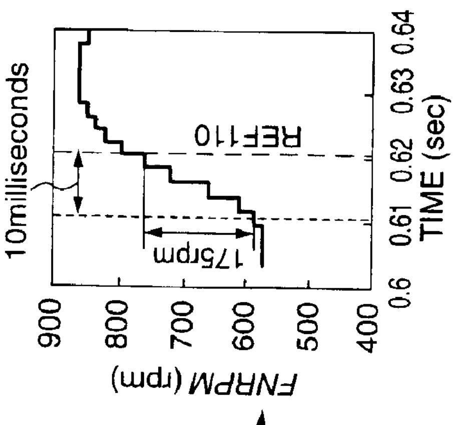
FIGS. 6A and 6B are diagrams showing the error caused by the detection timing of the POS signal on the engine rotation speed.
Figure 6A:
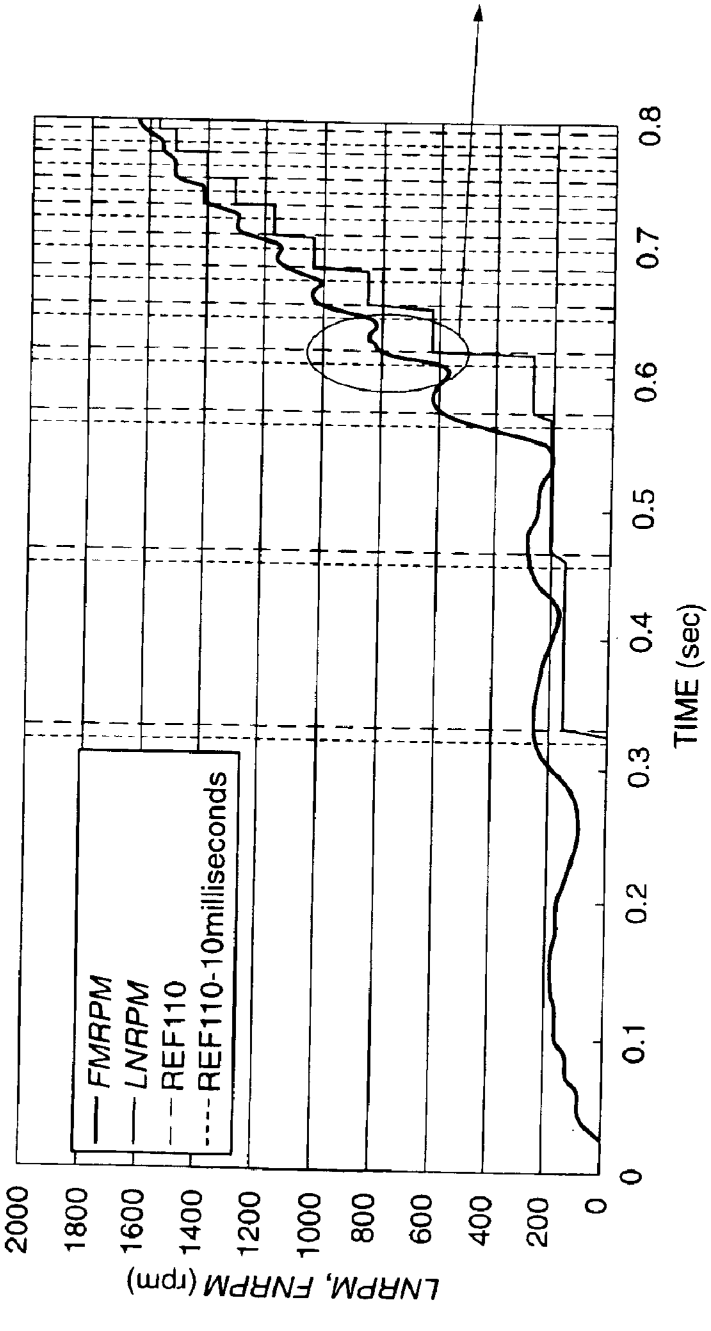

Firstly referring to FIGS. 6A and 6B, the relationship between the detection timing of the POS signal and the real engine rotation speed will be described. The engine rotation speed FNRPM3 based on the POS signal approximates the real engine rotation speed more than the engine rotation speed LNRPM based on the REF signal. This is particularly the case during the high variation in the engine rotation speed when starting the engine. During the high engine rotation variation in engine startup, as shown in FIG. 6B, it is sometimes the case that variation of up to 175 revolutions per minute (rpm) for example is experienced in the engine rotation speed during the ten milliseconds before the REF signal. Thus even when the engine rotation speed is calculated based on the POS signal, when there is a time lag between the time the POS signal is detected and the time fuel injection or ignition is actually performed, accurate control on ignition timing, fuel injection amount or the fuel injection timing is not possible. The fuel injection or ignition is performed at a fixed crank angle. Thus when control on fuel injection or ignition is performed at a fixed time cycle, the degree of time lag fluctuates in each control cycle.

The interval from the compression top dead center (CTDC) to input of the REF signal immediately thereafter always resides in the non-ignition crank angle range as described above. In this embodiment, during engine startup in which the engine rotation speed undergoes a considerable increase, control of the ignition and the fuel injection is executed synchronous with the REF signal input immediately after the compression top dead center (CTDC). However, after completion of engine startup, these control routines are executed at fixed time intervals.

Figure 7:
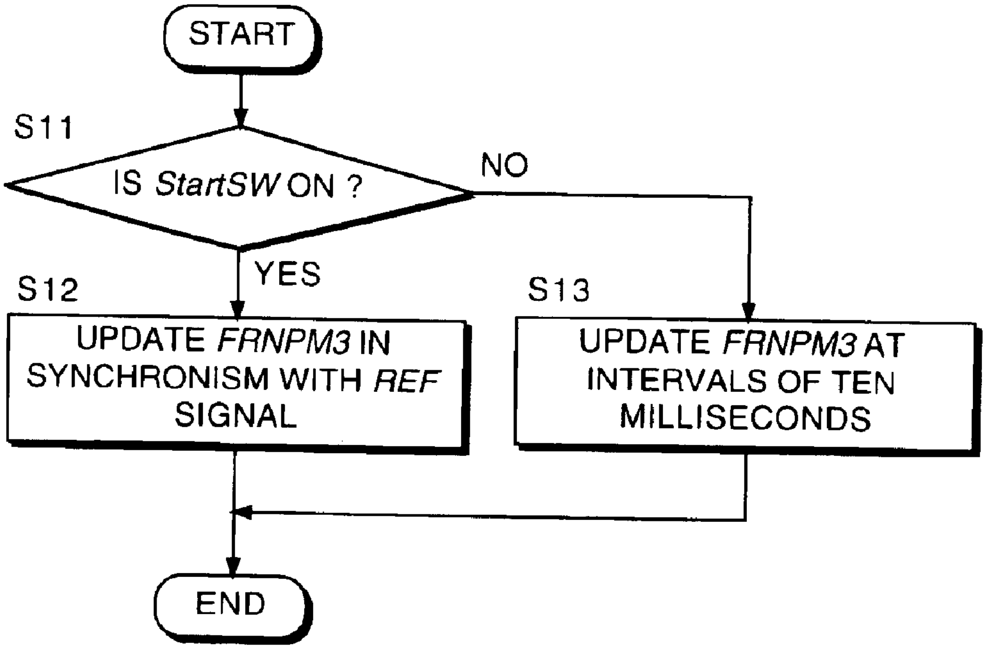
FIG. 7 is a flowchart showing a signal switching routine executed by the controller according to a second embodiment of this invention.

In this embodiment, the controller 1 executes a signal switching routine as shown in FIG. 7 in order to switch the control cycle. This routine is performed every ten milliseconds.

Referring to FIG. 7, firstly in a step S11, the controller 1 determines whether or not the start signal StartSW is ON.

Figure 3:
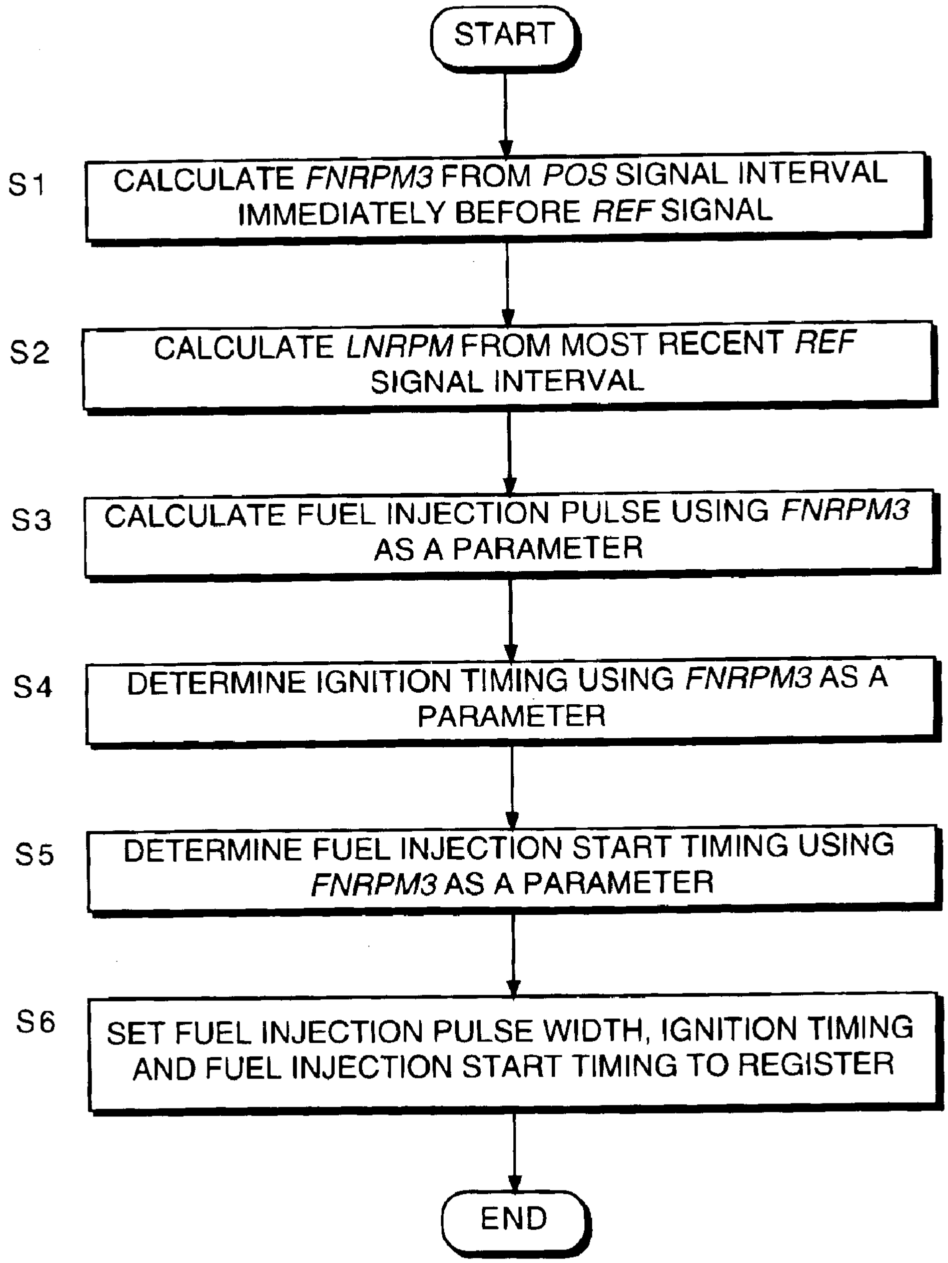
FIG. 3 is a flowchart describing a routine for controlling fuel injection and spark ignition of the engine executed by the controller.

When the start signal StartSW is ON, in a step S12 the controller 1 determines that the routine in FIG. 3 is executed synchronously with the REF signal.

When the start signal StartSW is not ON, in a step S13, the controller 1 determines that the routine in FIG. 3 is executed every ten milliseconds. After the process in the step S12 or S13, the controller 1 terminates the routine.

Figures 8A, 8B, 8C, 8D, 8E, 8F:
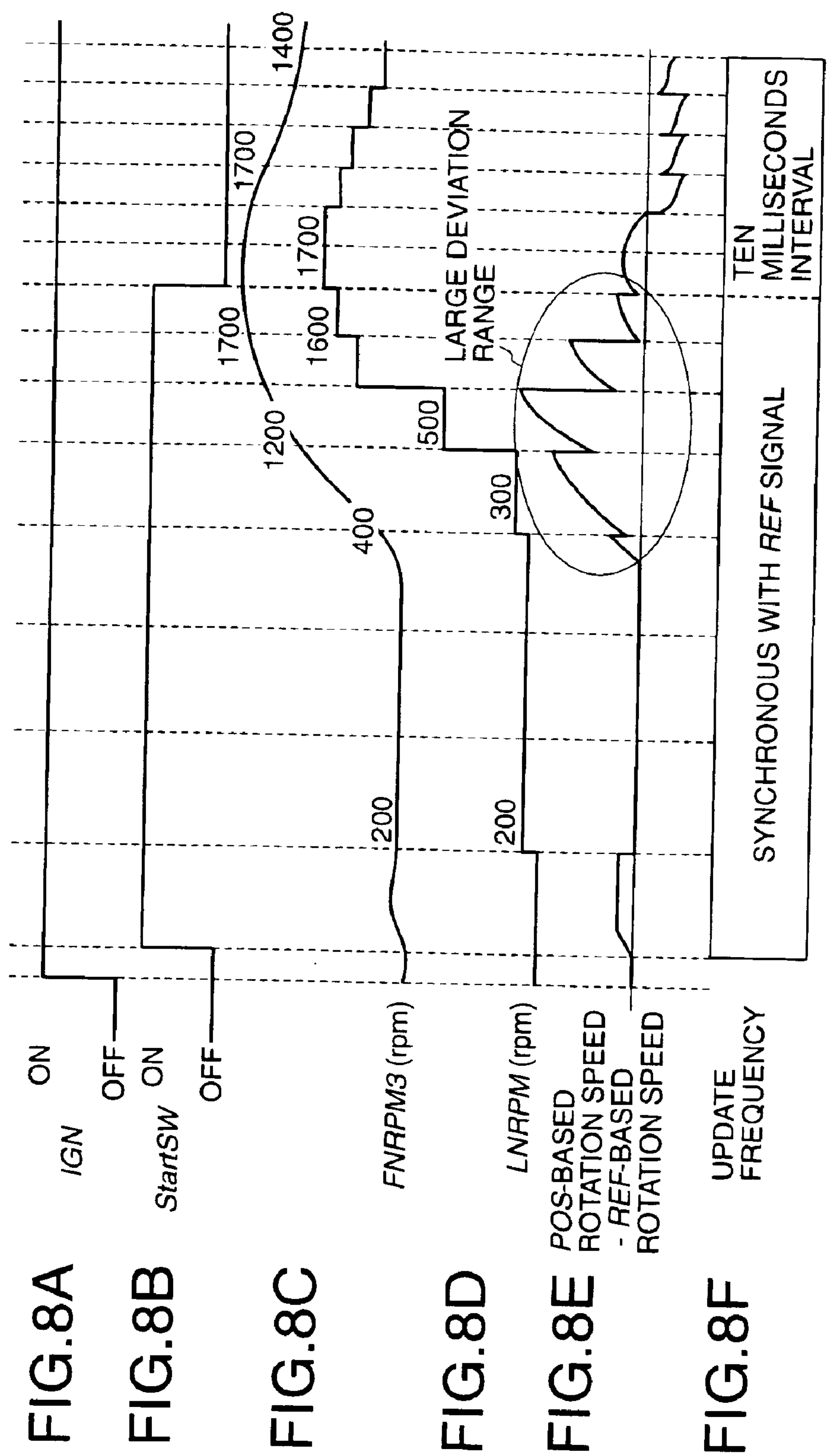
FIGS. 8A–8F are timing charts showing the effect of control executed by the controller according to the second embodiment of this invention.

As shown in FIGS. 8B and 8F, while the start signal StartSW is ON, the routine shown in FIG. 3 is executed synchronously with the REF signal. After the start signal StartSW is OFF, the routine in FIG. 3 is executed at an interval of ten milliseconds.

In a six-cylinder V-shape engine, six REF signals are output per revolution. Fuel injection and ignition are performed every three revolutions. Therefore executing the control routine for fuel injection and ignition in FIG. 3 at an interval of ten milliseconds is equal to executing the routine synchronous to the REF signal when the engine rotation speed is 2000 rpm. When the engine rotation speed is less than 2000 rpm, the control period for the execution of the routine synchronous to the REF signal exceeds an interval of ten milliseconds. As shown in FIG. 8C, when the rotation speed of the engine 2 is normally less than 2000 rpm during startup, execution of the routine synchronous with the REF signal actually decreases the calculation load.

On the other hand, when the routine in FIG. 3 is performed synchronous with the REF signal, the POS signal is detected immediately before the REF signal and the calculation operations in the steps S3–S5 are performed immediately thereafter. Thus it is possible to perform accurate detection of the engine rotation speed.

In comparison to the first embodiment, this embodiment makes it possible to increase the control accuracy on fuel injection and ignition during startup of the engine 2 and decrease the calculation load on the controller 1 during engine startup.

Figure 9:
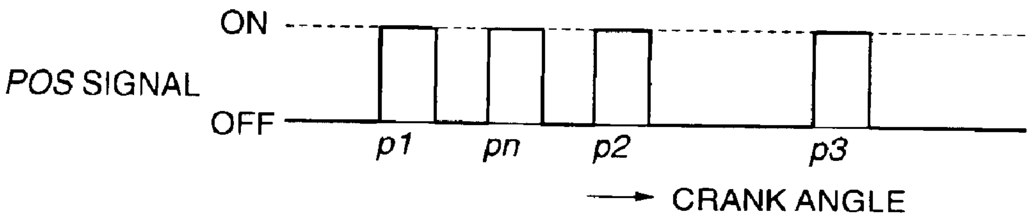
FIG. 9 is a diagram describing noise mixing in the POS signal.

Referring to FIG. 9, a third embodiment of this invention will be described.

This embodiment relates to a detection method for the POS signal. In the first and second embodiments, the undesirable effect of engine ignition noise on detection of the POS signal is eliminated by calculating the engine rotation speed based only POS signals outside the ignition crank angle range.

In this embodiment, exhaust noise is completely eliminated for the detection of the POS signal by calculating the engine rotation speed based on the POS signal at least three times in succession and using the smallest of those values as the engine rotation speed FNRPM3.

Referring to the POS signals p1, p2 and p3 in FIG. 9, it is assumed that a noise component pn is interposed between p1 and p2. The apparent POS signal interval in this case becomes p1-pn, pn-p2 and p2-p3. If we assume that the controller 1 detects the output interval of the POS signal on three successive occasions and calculates the engine rotation speed on the basis of the largest value for those three output intervals, the pulse interval p2-p3 which is not affected by noise will form the basis of the resulting engine rotation speed. In the step S1 in FIG. 3, when this calculation method is applied to the calculation of the engine rotation speed FNRPM3, it is possible to obtain an accurate engine rotation speed FNRPM3 free of the effects of noise.

The contents of Tokugan 2002-369849, with a filing date of Dec. 20, 2002 in Japan, are hereby incorporated by reference.

Although the invention has been described above by reference to certain embodiments of the invention, the invention is not limited to the embodiments described above. Modifications and variations of the embodiments described above will occur to those skilled in the art within the scope of Claims.

The embodiments of this invention in which an exclusive property or privilege is claimed are defined as follows:

What is claimed is:

1. An operation control device for an spark ignition internal combustion engine performing ignition in a fixed ignition crank angle range, comprising:

a unit crank angle sensor which output a unit crank angle signal corresponding to a unit crank angle of the engine; and a programmable controller programmed to:

calculate an engine rotation speed based on the unit crank angle signal while preventing the calculation of the engine rotation speed based on the unit crank angle signal detected in the ignition crank angle range from being performed, and control the engine according to the engine rotation speed.

2. The operation control device as defined in claim 1, wherein the controller is further programmed to execute the calculation of the engine rotation speed at a pre-set fixed time interval.

3. The operation control device as defined in claim 1, wherein the engine comprises a plurality of cylinders repeating a combustion cycle in a fixed angular interval and the operation control device comprises a reference position sensor which outputs a reference position signal at equal angular intervals, the number of the reference position being equal to the number of cylinders in a crank angle range of 360 degrees, and the controller is further programmed to select the most recent unit crank angle signal outside the ignition crank angle range by determining the ignition crank angle range based on the reference position signal, and to calculate the engine rotation speed based on a selected unit crank angle signal.

4. The operation control device as defined in claim 3, the ignition crank angle range is set to a fixed advance angle range from a compression top dead center for each cylinder.

5. The operation control device as defined in claim 4, wherein the engine is a four-stroke cycle six-cylinder engine, and the controller is further programmed to calculate the engine rotation speed based on an interval of unit crank angle signals detected in a range from the compression top dead center for each cylinder to the input of the next reference position signal.

6. The operation control device as defined in claim 4, wherein the device further comprises a cylinder discrimination sensor which specifies the compression top dead center for each cylinder in combination with the reference position signal.

7. The operation control device as defined in claim 1, wherein the controller is further programmed to determine a target value of an engine control item selected from a fuel injection amount, a fuel injection timing and an ignition timing to an injected fuel, and control the engine to realize the target value.

8. The operation control device as defined in claim 7, wherein the device further comprises a startup sensor which determines whether or not the engine is starting up, and the controller is further programmed to control the engine in synchronism with the reference position signals when the engine is starting up and to control the engine at fixed time intervals when the engine is not starting up.

9. The operation control device as defined in claim 8, wherein the engine further comprises a starter motor cranking the engine, the startup sensor comprises a switch which outputs a start signal for commanding current supply to the starter motor, and the controller is further programmed to determine that the engine is starting up when the start signal is ON.

10. The operation control device as defined in claim 1, wherein the controller is further programmed to measure three intervals of the unit crank angle signals in succession, and to calculate the engine rotation speed based on the maximum value of the three intervals.

11. An operation control device for an spark ignition internal combustion engine performing ignition in a fixed ignition crank angle range, comprising:

means for outputting a unit crank angle signal corresponding to a unit crank angle of the engine;

means for calculating an engine rotation speed based on the unit crank angle signal while preventing the calculation of the engine rotation speed based on the unit crank angle signal detected in the ignition crank angle range from being performed; and means for controlling the engine according to the engine rotation speed.

12. An operation control method for an spark ignition internal combustion engine performing ignition in a fixed ignition crank angle range, comprising:

detecting a unit crank angle signal of the engine;

calculating an engine rotation speed based on the unit crank angle signal while preventing the calculation of the engine rotation speed based on the unit crank angle signal detected in the ignition crank angle range from being performed; and controlling the engine according to the engine rotation speed.

13. The operation control device as defined in claim 2, wherein the controller is further programmed to determine a target value of an engine control item selected from a fuel injection amount, a fuel injection timing and an ignition timing to an injected fuel, and control the engine to realize the target value.

14. The operation control device as defined in claim 3, wherein the controller is further programmed to determine a target value of an engine control item selected from a fuel injection amount, a fuel injection timing and an ignition timing to an injected fuel, and control the engine to realize the target value.

15. The operation control device as defined in claim 4, wherein the controller is further programmed to determine a target value of an engine control item selected from a fuel injection amount, a fuel injection timing and an ignition timing to an injected fuel, and control the engine to realize the target value.

16. The operation control device as defined in claim 5, wherein the controller is further programmed to determine a target value of an engine control item selected from a fuel injection amount, a fuel injection timing and an ignition timing to an injected fuel, and control the engine to realize the target value.

17. The operation control device as defined in claim 6, wherein the controller is further programmed to determine a target value of an engine control item selected from a fuel injection amount, a fuel injection timing and an ignition timing to an injected fuel, and control the engine to realize the target value.

* * * * *